United States Patent
Shi et al.

(10) Patent No.: US 6,625,615 B2
(45) Date of Patent: Sep. 23, 2003

(54) DATA PROCESSING SYSTEM AND METHOD FOR MULTI-LEVEL DIRECTORY SEARCHES

(75) Inventors: Shepherd Shi, Austin, TX (US); Reginal R. Hill, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 09/740,251

(22) Filed: Dec. 19, 2000

(65) Prior Publication Data

US 2002/0078032 A1 Jun. 20, 2002

(51) Int. Cl.[7] .............................. G06F 7/00; G06F 17/00

(52) U.S. Cl. ....................................... 707/103 R; 707/3

(58) Field of Search .............................. 707/103 R, 100, 707/102, 10, 3, 201, 9, 2; 701/202, 201; 702/2

(56) References Cited

U.S. PATENT DOCUMENTS

| | | | | | |
|---|---|---|---|---|---|
| 5,916,299 | A | * | 6/1999 | Poppen ........................ | 701/202 |
| 6,377,957 | B1 | * | 4/2002 | Jeyaraman ................... | 707/200 |
| 6,427,123 | B1 | * | 7/2002 | Sedlar ........................... | 702/2 |
| 6,446,059 | B1 | * | 9/2002 | Berger et al. ................. | 707/2 |
| 6,470,332 | B1 | * | 10/2002 | Weschler ...................... | 707/3 |
| 6,470,344 | B1 | * | 10/2002 | Kothuri et al. .............. | 707/100 |
| 6,480,857 | B1 | * | 11/2002 | Chandler .................... | 707/100 |

OTHER PUBLICATIONS

Sudarshan S. Chawathe, Anand Rajaraman, Hector Garcia–Molina, and Jennifer Widom titled "Change Detection in☐☐Hierarchically Structured Information" SIGMOD '96 6/96 Montreal, Canada copyright 1996 ACM 0–89791–794–4/96/0006 pp. 493–504.*

Nick Roussopoulos, Stephen Kelley & Frederic Vincent, titled "Nearest Neighbor Queries", Proc. of ACM SIGMOD Int'l Conf. on Management of Data, 1995, 71–79.*

Henning Maass, Titled "Location–aware mobile applications based on directory services" Copyright ACM Mobile Networks and Applications Aug. 1998 p. 157–173.*

* cited by examiner

*Primary Examiner*—Diane D. Mizrahi
(74) *Attorney, Agent, or Firm*—Barry S. Newberger; Winstead Sechrest & Minick P.C.; Jeffrey S. LaBaw

(57) ABSTRACT

An apparatus and method for performing a multi-level directory search are implemented. The directory information may be stored in a backing store in accordance with a relational database. An ancestor table is generated which maps each node in the directory which is an ancestor of one or more descendant nodes to each of its ancestor nodes. Each node is associated with a unique identifier, which may be used to relate ancestor and descendant nodes. The table includes the identifier of each ancestor in association with all the corresponding descendants. Additionally, the table maps the distance between the ancestor and each descendant. For a search initiated at a given node the distance values may be used to delimit a search in accordance with a specified search scope. The search scope may be specified as a parameter in a Lightweight Directory Access Protocol (LDAP) search request.

27 Claims, 7 Drawing Sheets

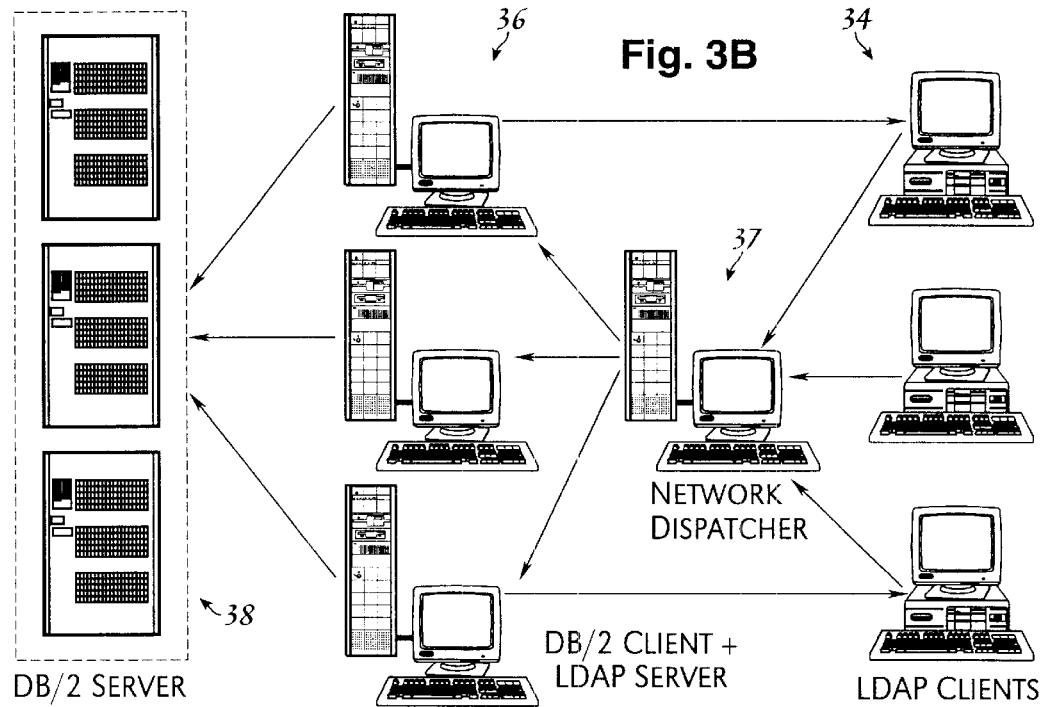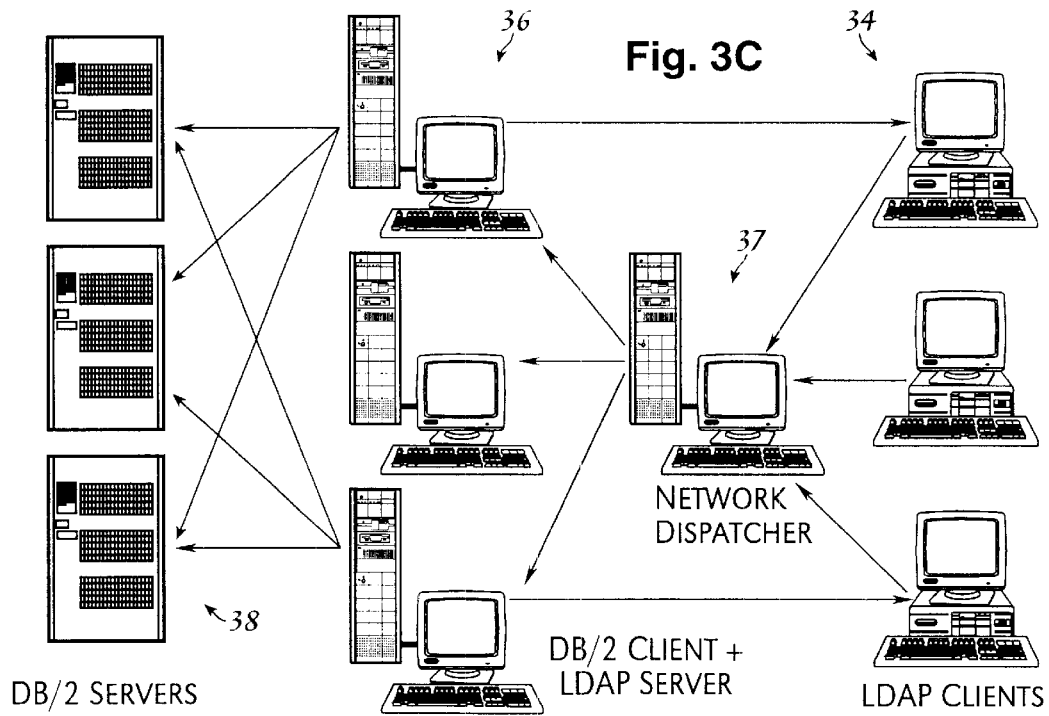

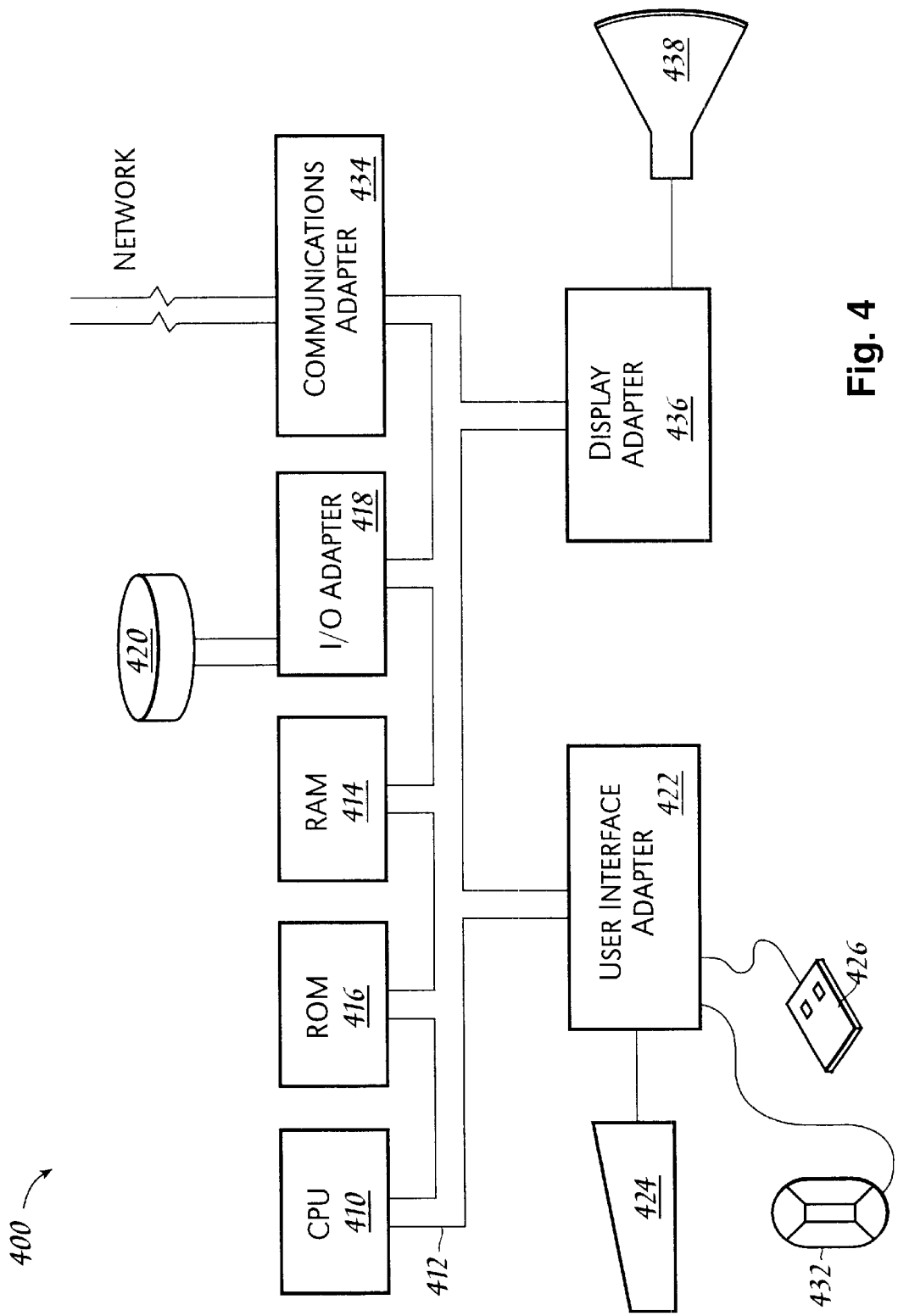

600

| AEID | EID | DISTANCE |
|---|---|---|
| 1 | 2 | 1 |
| 1 | 3 | 1 |
| 1 | 4 | 2 |
| 1 | 5 | 2 |
| 1 | 6 | 3 |
| 1 | 7 | 3 |
| 1 | 8 | 4 |
| 1 | 9 | 4 |
| 1 | 10 | 4 |
| 3 | 4 | 1 |
| 3 | 5 | 1 |
| 3 | 6 | 2 |
| 3 | 7 | 2 |
| 3 | 8 | 3 |
| 3 | 9 | 3 |
| 3 | 10 | 3 |
| 4 | 6 | 1 |
| 4 | 7 | 1 |
| 4 | 8 | 2 |
| 4 | 9 | 2 |
| 4 | 10 | 2 |
| 6 | 8 | 1 |
| 6 | 9 | 1 |
| 7 | 10 | 1 |

DATA PROCESSING SYSTEM AND METHOD FOR MULTI-LEVEL DIRECTORY SEARCHES

CROSS REFERENCE TO RELATED APPLICATION

The present invention is related to the following U.S. patent application which is hereby incorporated herein by reference: Ser. No. 09/740,226 entitled "Apparatus for Indirect Directory Searches and Method Therefor" (Attorney Docket No. AUS9-2000-0761-US1).

TECHNICAL FIELD

The present invention relates in general to data processing systems, and in particular, to data processing systems for directory management and directories having a backing store implemented as a relational database.

BACKGROUND INFORMATION

Information describing the various users, applications, files, printers and other resources accessible in a multi-user environment is often collected into a special database which may be referred to as a directory. The Lightweight Directory Access Protocol (LDAP) is an open architecture set of protocols for accessing and updating information in a directory. (LDAP version 2 is defined in Request for Comments (RFC) 1777, and LDAP version 3 is specified in RFC 2251, December 1997 (copyright, The Internet Society, 1997)). RFC 1777 and RFC 2251 are hereby incorporated herein by reference.

In the LDAP, the basic unit of information stored in the directory is referred to as an entry. Entries represent objects of interest, for example, in a multi-user dataprocessing system environment, people, servers, organizations, etc. Entries are composed of a collection of attributes that contain information about the object. Every attribute has a type and one or more values. Attribute types are associated with a syntax. The syntax specifies what kind of value can be stored. Directory entries are arranged in a tree structure or hierarchy. (Entries may also be referred to as nodes, and the terms may be used interchangeably herein.) The organization of the tree structure and the type of objects that can be stored in the directory as well as their attributes are defined in the schema for the objects. The set of schema defining a particular directory provides a road map to the organization of the directory. (Note, that the schema do not refer to the instances of entries in a particular directory.) Additionally, the data store that contains the information constituting the directory may be implemented using a multiplicity of mechanisms. The LDAP itself does not specify a particular storage mechanism. For example, the directory storage mechanism may be implemented using flat files, a binary tree (b-tree) or a relational database.

Directory entry information is retrieved by formulating an LDAP search. An application may perform a search by invoking an application program interface (API) call, as discussed in the commonly owned U.S. Pat. No. 6,085,188, entitled "Method of Hierarchical LDAP Searching With Relational Databases," to Bachmann, et al., which is hereby incorporated in its entirety herein by reference. A search within the directory hierarchy is specified in LDAP by a "distinguished name" (DN). A DN (discussed further hereinbelow) is a unique name that unambiguously identifies a single entry within the directory hierarchy. The search request also may include a search scope which specifies the depth of the search in the directory hierarchy. However, the search scope which may be specified in a directory having a relational database as a backing store is limited. Consequently, there is a need in the art for mechanisms for providing an arbitrary search level in a directory having a backing store implemented as a relational database.

SUMMARY OF THE INVENTION

The aforementioned needs are addressed by the present invention. Accordingly, there is provided, in a first form, a search method. The method includes retrieving one or more second node identifiers, and an associated distance value in response to a first node identifier. For each node corresponding to one of the one or more second identifiers having a corresponding one of the associated distance values not greater that a preselected distance value, the node is matched against a first search parameter.

There is also provided, in a second form, a computer program product in a tangible storage medium. The program product includes a program of instructions for retrieving one or more second node identifiers, and an associated distance value in response to a first node identifier. Also included are instructions for matching the node against a second search parameter for each node corresponding to one of the one or more second identifiers and having a corresponding one of the associated distance value not greater that a preselected distance value.

Additionally, there is provided, in a third form, a data processing system. The system contains circuitry operable for retrieving one or more second node identifiers, and an associated distance value in response to a first node identifier. The system also has circuitry operable, for each node corresponding to one of the one or more second identifiers having a corresponding one of the associated distance value not greater that a preselected distance value, matching the node against a first search parameter.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A–3C illustrate a representative directory service data processing system having a relational database backing store;

FIG. 4 illustrates, in block diagram form, a data processing system which may be used in an embodiment of a client or server in the directory data processing system of FIG. 1;

FIG. 6 illustrates an ancestor table corresponding to the naming hierarchy of FIG. 5;

DETAILED DESCRIPTION

Figure 1:
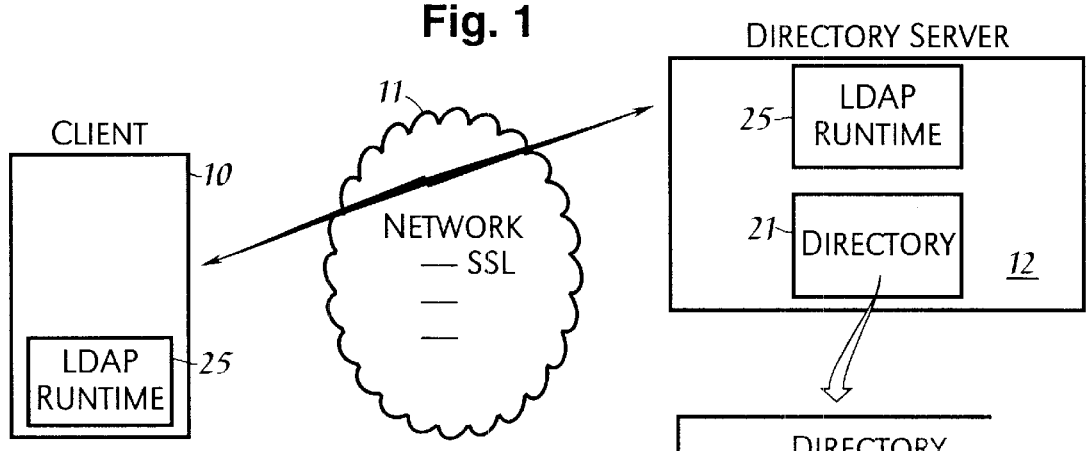
FIG. 1 illustrates, in block diagram form, a representative directory service system which may be used in an embodiment of the present invention.
Figure 2:
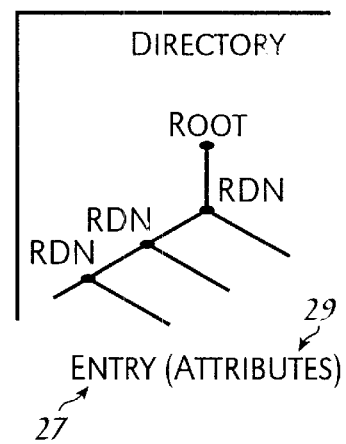
FIG. 2 illustrates a simplified directory hierarchy.

The present invention provides a system and method for performing a multi-level directory search. The directory information may be stored in a backing store in accordance with a relational database. An ancestor table is generated which maps each node in the directory which is an ancestor of one or more descendant nodes to each of its ancestor nodes. Each node is associated with a unique identifier, which may be used to relate ancestor and descendant nodes. The table includes the identifier of each ancestor in association with all the corresponding descendants. Additionally, the table maps the distance between the ancestor and each descendant. For a search initiated at a given node the distance values may be used to delimit a search in accordance with a specified search scope. The search scope may be specified as a parameter in a Lightweight Directory Access Protocol (LDAP) search request.

In the following description, numerous specific details are set forth such as specific identifier values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A block diagram of a representative LDAP directory service in which the present invention may be implemented is shown in FIG. 1. A previously described, LDAP is the lightweight directory access protocol. This protocol may be implemented as either a front end to the X.500 directory service, or as a standalone directory service. According to the protocol, a client machine 10 makes a TCP/IP connection to an LDAP server 12 through network 11, sends requests and receives responses. LDAP server 12 supports a directory 21 as illustrated in a simplified form in FIG. 1. Each of the client and server machines further include a directory "runtime" component 25 for implementing the directory service operations as will be described below. As previously discussed, the directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII text, binary characters, and the like) and how these values are constrained during a particular directory operation.

The directory tree (referred to in the LDAP as the Directory Information Tree (DIT)) is organized in a predetermined manner, with each entry uniquely named relative to its sibling entries by a "relative distinguished name" (RDN). An RDN is derived from the attributes of the corresponding directory entry. An RDN may typically have the form <attribute name>=<attribute value>. According to the protocol, a globally unique name for an entry, the distinguished name (DN), may be a concatenation of the RDN sequence from a given entry to the tree root. RDNs, and DNs will be further discussed hereinbelow, in conjunction with FIG. 5.

Figure 3A:
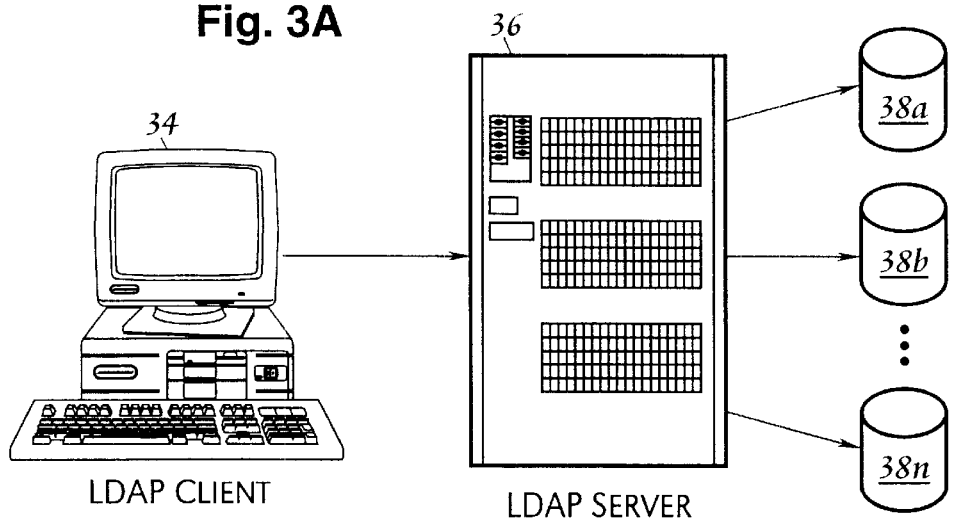

It may be desirable to store LDAP directory data in a backing store. FIGS. 3A–3C illustrates several representative LDAP directory service implementations that use a relational database management system (RDBMS) for this purpose. These systems merely illustrate possible LDAP directory services in which the present invention may be implemented. One of ordinary skill would appreciate, however, that the invention is not limited to an LDAP directory service provided with a DB/2 backing store. The principles of the present invention may be practiced in other types of directory services (e.g, X.500) and using other relational database management systems (e.g., Oracle, Sybase, Informix, and the like) as the backing store.

In FIG. 3A, an LDAP client 34 can connect to a number of networked databases 38a–38n through an LDAP server 36. The databases 38a–38n contain the directory information. However, from the user's perspective, the LDAP server 36 actually stores all the information without knowing the database 38 in which the data is actually located. With this configuration, the LDAP server 36 is freed from managing the physical data storage and is able to retrieve information from multiple database servers 38 which work together to form a huge data storage.

FIG. 3B illustrates a multiple client/multiple server LDAP/DB2 enterprise solution. In this environment, a DB/2 client may run on each LDAP server 36. Each such DB/2 client can connect to any database server 38 containing directory information. The collection of database servers 38a–38n form a single directory system image, and one or more of the LDAP servers 36 can access such information. Because all the LDAP servers 36 see the same directory image, a network dispatcher 37 may be deployed to route requests among the LDAP servers 36.

FIG. 3C illustrates a multiple client/parallel super server configuration. In certain environments, where users need to store large amounts of information into the directory, this configuration automatically partitions the database into different machines 38. In addition, database queries are divided into smaller, independent tasks that can execute concurrently, which increases end user query response time. This configuration enables users to store up to terabytes of data into the database.

Referring now to FIG. 4, an example is shown of a data processing system 400 which may be used for the invention. System 400 may, for example, be used in an embodiment of client 10, or server 14, FIG. 1. The system has a central processing unit (CPU) 410, which is coupled to various other components by system bus 412. Read only memory ("ROM") 416 is coupled to the system bus 412 and includes a basic input/output system ("BIOS") that controls certain basic functions of the data processing system 400. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 436. Keyboard 424, track ball 432, mouse 426 and are all interconnected to bus 412 via user interface adapter 422. (An artisan of ordinary skill would appreciate that implementation of system 400 as a server, such as server 12, FIG. 1, may omit one or more I/O devices.) Display monitor 438 is connected to system bus 412 by display adapter 436. In this manner, a user is capable of inputting to the system throughout the keyboard 424, trackball 432 or mouse 426 and receiving output from the system via display 438.

Preferred implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 5:
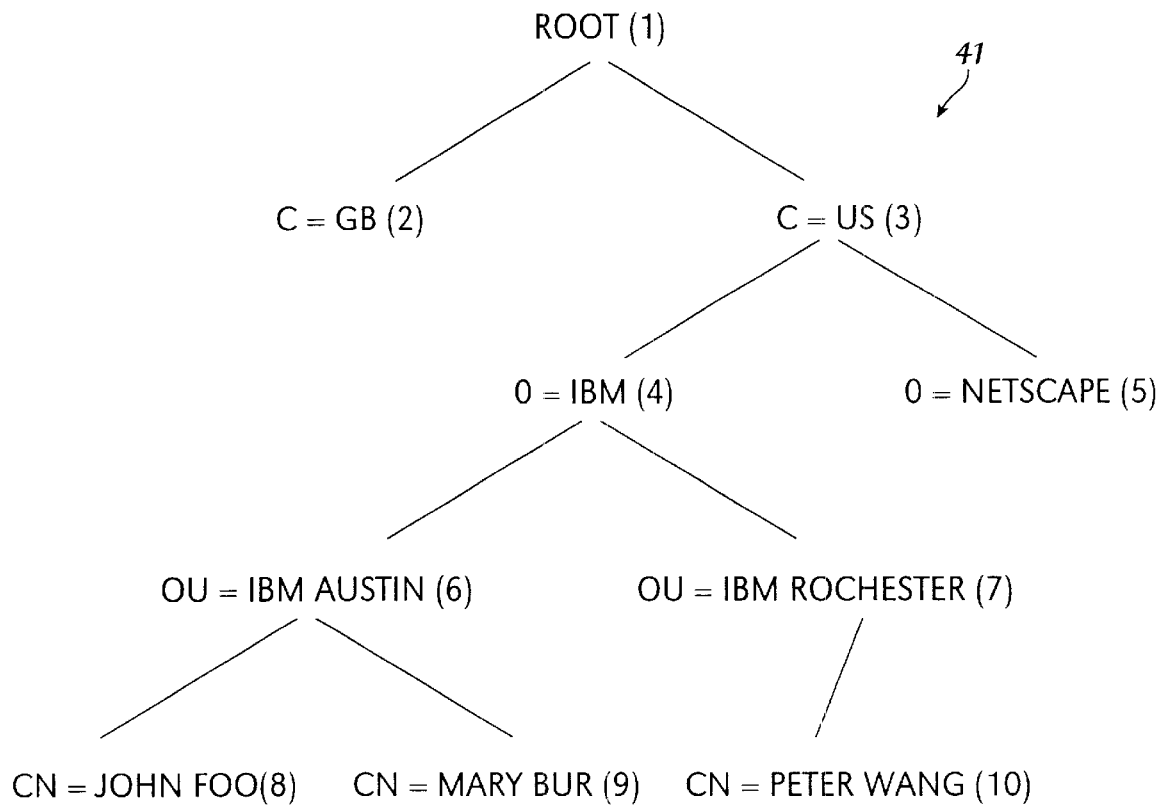
FIG. 5 shows, a simplified illustrative Lightweight Directory Access Protocol (LDAP) naming hierarchy.

A exemplary naming heirarchy which may be used in an embodiment of the present invention is shown in FIG. 5. As would be recognized by the ordinarily skilled artisan, the heirarchy in FIG. 5 is for illustrative purposes, and not intended to depict a either particular or generic implementation of an LDAP DIT. As seen in FIG. 5, the LDAP naming hierarchy includes a number of entries or nodes, with each entry or node represented by a unique entry identifier (EID). (Note that the EID may be assigned by the backing store database management system, and need not be an attribute in the LDAP directory schema.) Thus, for example, the root node has an EID=1. Root has two (2) children, entry GB ("Great Britain") having an EID=2, and entry US ("United States") having an EID=3. Child node US itself has two (2) children, O=IBM (with EID=4) and O=Netscape (with EID= 5). The remainder of the naming directory includes several additional entries at further sublevels.

A particular entry thus may be a "parent" of one or more child entries. An entry is considered a "parent" if it is located in a next higher level in the hierarchy. Likewise, a particular entry may be an ancestor of one or more descendant entries across many different levels of the hierarchy. A parent-child entry pair will thus also represent an ancestor-descendant pair.

In accordance with the principles of the present invention, an ancestor table maps the associations between ancestors and descendants. FIG. 6 illustrates an embodiment of an ancestor table 600 corresponding to the naming hierarchy of FIG. 5. Again, table 600 is illustrative. Table 600 includes a plurality of entries 602, represented by the rows of table 600. Each entry 602 includes three fields. Each field 604 (collectively represented by the column labeled AEID in table 600) contains the value of an EID of an ancestor node. An ancestor node has at least one descendant. (Thus, for example, referring to FIG. 5, the node with RDN "C=GB" is not an ancestor node, and the node "C=US" is an ancestor node.) Each field 606 (collectively represented by the column labeled EID in table 600) holds the value of a descendant of the corresponding ancestor.) Each field 608 (collectively represented by the column labeled Distance in table 600) contains the distance between the ancestor and the corresponding descendant. A methodology for generating an ancestor table is discussed in conjunction with FIG. 7.

Figure 7:
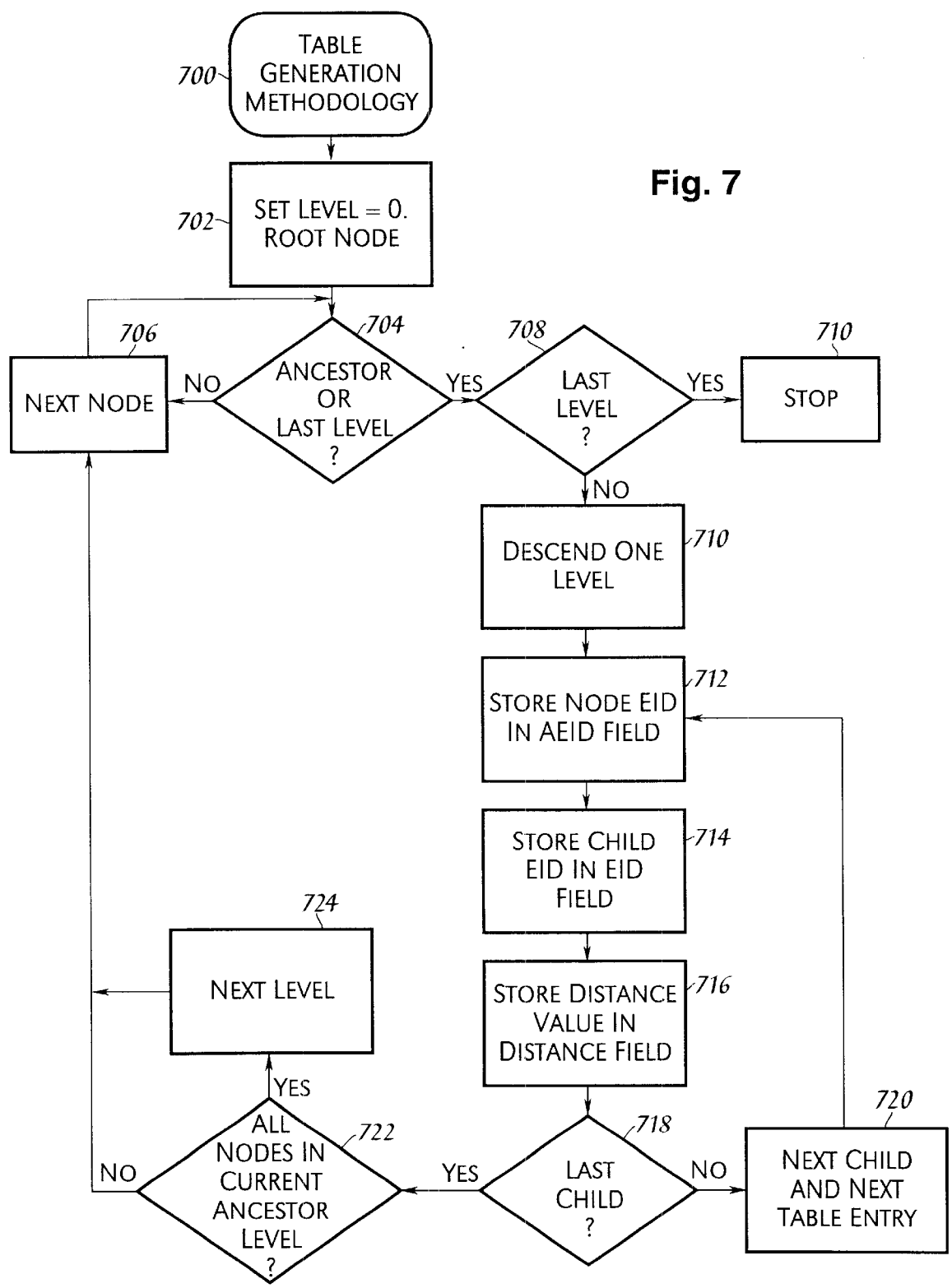
FIG. 7 illustrates, in flow chart form a table generation methodology in accordance with an embodiment of the present invention.

Referring now to FIG. 7, there is illustrated therein methodology 700 for generating an ancestor table, such as Table 600 in FIG. 6. In step 702 a level value is set to zero. Additionally, a current node is set to the root node of the hierarchy for which the ancestor table is to be generated.

Methodology 700 then loops over all of the nodes in the hierarchy. In step 704 it is determined if the current node is an ancestor. That is, it is determined if the current node has one or more descendant nodes. As previously described, in conjunction with the exemplary naming hierarchy 41 illustrated in FIG. 5, the node with the RDN "C=GB," with EID (2), has no descendants, and therefore, is not an ancestor node. Note that unless the hierarchy is empty, a root node always has at least one descendant. Returning to FIG. 7, if the current node is not an ancestor node, process 700 proceeds to the next node, step 706 and returns to step 704. If, however, in step 704 the current node is an ancestor then step 704 proceeds by the "Yes" branch thereof. Additionally, process 700 sweeps through the naming hierarchy by level, and when the last level is reached, no nodes at the lowest level of the hierarchy can be ancestor nodes (otherwise the level is not the lowest level). Thus, in step 704, process 700 breaks out of the loop if the last level in the hierarchy has been reached, wherein step 704 also proceeds by the "Yes" branch to step 708. In step 708 if the current level is the last level, then process 700 terminates, step 710.

Otherwise, in step 708, if the current level is not the last level, then in step 710 process 700 descends one level, and in step 712 stores the EID of the current ancestor node in an AEID field, for example a field 604, FIG. 6, of a current entry the table being generated. In step 714, the EID of a child node is stored in the corresponding EID field of the current table entry. The EID is the identifier of a child node of the current ancestor. In step 716, the distance value is stored in a distance field corresponding to the current table entry. The distance value is determined as the difference between the current level and the level of the ancestor.

In step 718, it is determined if the current child is the last child of the ancestor node at the current level. If not, in step 720, process 700 proceeds to the next child, and the next table entry and returns to step 712 to complete filling the table entry for the next child as described above. Process 700 loops over step 712–720 until all the children of the current ancestor at the current level in the heirarchy have populated table entries. Step 718 then proceeds by the "Yes" branch, and in step 722 it is determined if all the nodes at the level of the current ancestor have been entered in the table. If not, process 700 proceeds to the next node, step 706 and then returns to step 704 to generate table entries for the descendants of the next node if, as determined in step 704, the next node is an ancestor node, as previously described.

Returning to step 722, if all the nodes at the current level of the ancestor node being entered in the table have been entered, process 700 proceeds to the next level in the heirarchy, step 724, and then to the next node in the hierarchy, which is a node in the next level of the naming hierarchy. Process 700 then loops over all nodes at the next level, and then proceeds through the levels until the last level of the hierarchy is reached, as previously discussed.

Figure 8:
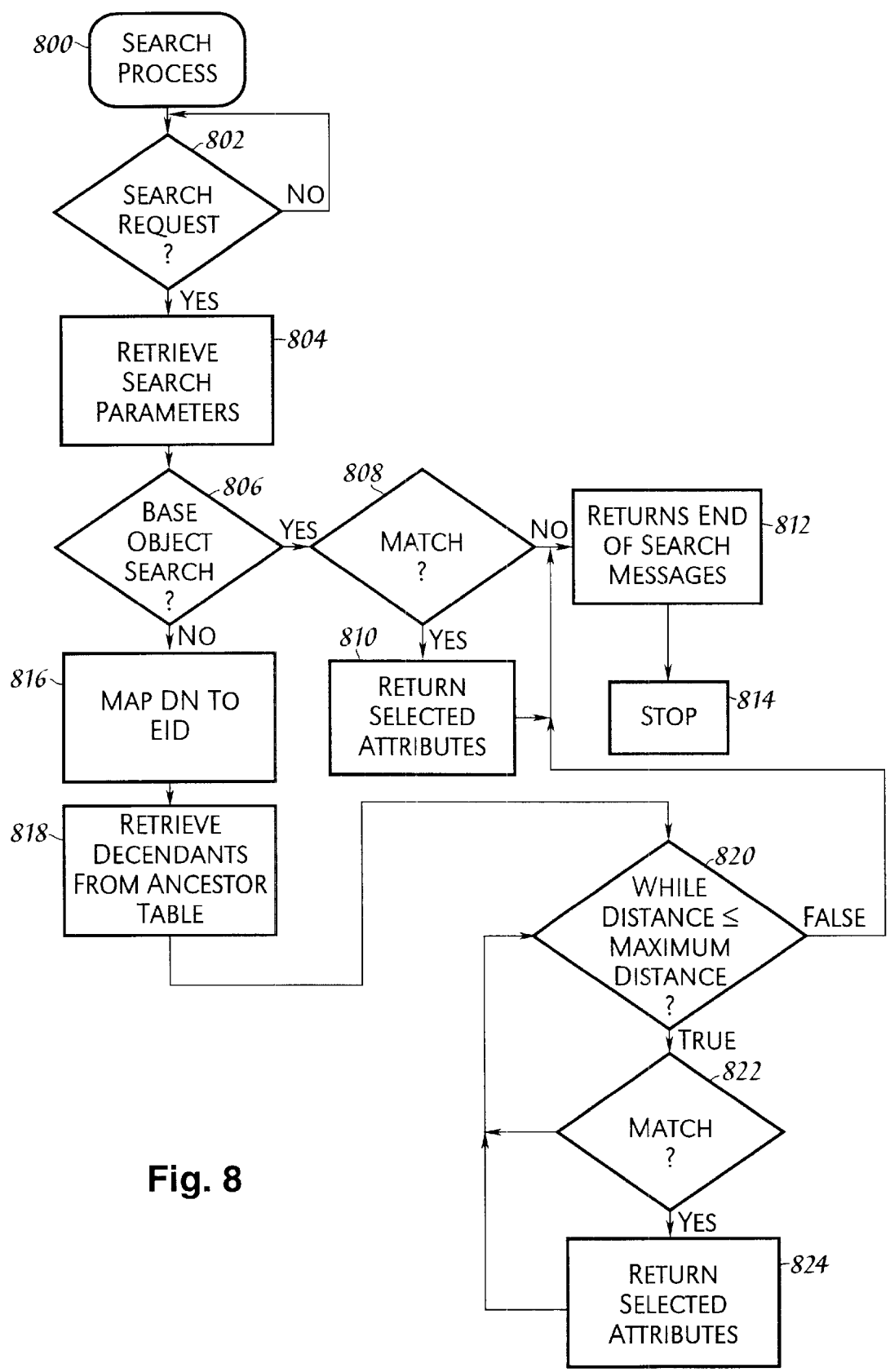
FIG. 8 illustrates, in flow chart form, a search methodology in accordance with an embodiment of the present invention.

Refer now to FIG. 8, illustrating in flow chart form, a search process 800 in accordance with the principles of the present invention, using an ancestor table such as table 600, FIG. 6. In step 802, process 800 waits for a search request. Search requests may be in an LDAP message as defined in the LDAP Specification, RFC 2251.

If a search request is received, the search parameters are retrieved from the request, step 804. Recall that the directory structure is in the form of a tree, the DIT, in which each node is uniquely named relative to its siblings by an RDN. Each node may be identified by a globally unique name, the DN, formed by concatenating, in accordance with a syntax specified in the LDAP, RDNs. An LDAP search is specified by a set of parameter values. The starting point of the search, called the base object, is specified by a DN for the base object. (The base object is a node within the DIT.) The LDAP search parameters may include the search scope. The scope defines the depth of the search within the DIT relative to the base object. In an embodiment of the present invention in accordance with the LDAP, the search may be limited to the base object. Additionally, the scope may specify a single level wherein the immediate children of the base object are also searched. The search scope may also be subtree. In a search having subtree scope, the base object and all descendants thereof are searched. Alternatively, a depth level may be specified, wherein a search depth may be specified, which may be less than the entire subtree of the base node.

Additionally, the search parameters may include a search filter. The search filter specifies the criteria that an entry must match to be returned from a search. The search filter is a Boolean combination of attribute value assertions (attribute names and attribute values) and Boolean operators, such as AND, OR and NOT. An attribute value assertion tests the value of an attribute for equality, less than or equal, etc. The syntax of LDAP search filters is specified in RFC 1960, which is hereby incorporated herein by reference. A search request may also specify the attributes to be returned This parameter lists which attributes are to be retrieved from entries that match the search criteria. (The translation of LDAP search filter expressions into Structured Query Language (SQL) queries is discussed in the commonly-owned U.S. Pat. No. 6,085,188, incorporated herein by reference.)

In step 806, it is determined if the search scope, as discussed hereinabove in conjunction with step 804, is a base object search. If so, it is determined, in step 808, if the attribute assertions in the base object match the search filter, as also discussed hereinabove in conjunction with step 804. If so, in step 810, the attributes selected in the search query are returned, step 810. Otherwise, process 800 returns an end of search message, step 812, and terminates, step 814.

Returning to step 806, if the search scope is not a base object search, in step 816 the DN is mapped to a corresponding EID. Recall that the DN is the distinguished name of the base object specified in the search request. Step 816 associates the distinguished with its corresponding EID, such as the EIDs described in conjunction with FIG. 5. In step 818 the EIDs for the descendant nodes of the base object are retrieved from an ancestor table. In an embodiment of the present invention in which an ancestor table is implemented in accordance with the exemplary ancestor table illustrated in FIG. 6, the EIDs of the descendant nodes may be determined by referring to the table entries having, in the corresponding AEID field, the value corresponding to that of the EID mapped in step 816. Thus, referring to FIG. 6, if for example, the DN corresponds to the node with RDN "C=US", in the search parameters received in step 804 the DN maps to the value "3", and the descendant EIDs would correspond to the values in the EID field of entries 610A–610G. The aforesaid example is meant to be illustrative, and need not correspond to an implementation of the present invention.

Process 800 then loops over the descendants having a distance value that is less than, or equal to, a maximum distance corresponding to the search scope specified in the search parameters retrieved in step 804. The maximum distance may correspond to the depth of search specified in the search scope parameter retrieved in step 804. Additionally, a predetermined symbol, or value, for example "−1" may be used to specify a subtree search. If such as symbol, or value, is used to specify a subtree search, then the maximum distance may be determined as the largest value of the distances in the table entries for the ancestor node corresponding to the mapped EID for the base object. Again, referring to the aforesaid example for a DN mapping to an EID of value "3", the maximum distance value is "3" as may be understood by referring to the corresponding distance fields of entries 610A–610G.

Returning to step 820, while the distances in the entries corresponding to the descendants retrieved in step 818 are less than or equal to the maximum distance, each descendant node is matched against the filter received in the search request, step 822. The nodes to be matched against the search filter are determined by the nodes corresponding to the EIDs retrieved in step 818. If an entry matches the filter, the attributes selected in the attribute list parameter retrieved in step 804 are returned, step 824, and process 800 returns to step 820 to continue the loop over the descendant nodes within the scope of the search. If, however, in step 822, a node fails to match the search filter, step 824 is bypassed. After all nodes having distance values less than or equal to the maximum distance in step 820, have been matched, against the search filter, the condition in step 820 becomes false, and process 800 returns, in step 812, an end of search message and terminates in step 814. It should be appreciated that the flow charts described above are representative in nature, and that the operations above may be effected, typically, using a standard SQL query. Exemplary SQL are illustrated in the commonly-owned U.S. Pat. No. 6,085,188 to Bachmann et al.

Although the present invention and its advantages have been described in detail, it should be understood that various changes, substitutions and alterations can be made herein without departing from the spirit and scope of the invention as defined by the appended claims.

What is claimed is:

1. A search method comprising the steps of:
   retrieving one or more second node identifiers, and an associated distance value in response to a first node identifier; and
   for each node corresponding to one of said one or more second identifiers having a corresponding one of said associated distance value not greater than a preselected distance value, matching said node to a first parameter, wherein the first node identifier comprises a directory node distinguished name search parameter, and the associated distance value comprises a number of levels between the directory node having the first node identifier and a directory node having the second node identifier.

2. The method of claim 1 further comprising the step of returning a value of each of one or more selected members of each node having a match in response to said matching step.

3. The method of claim 1 wherein said one or more second node identifiers and said associated distance value are retrieved from a table, said table including an entry corresponding to each said second node identifier, each entry having a first portion for containing said second node identifier and a second portion for containing said associated distance.

4. The method of claim 3 further comprising the step of generating said table.

5. The method of claim 3 wherein each entry of said table includes a third portion for containing an identifier of an ancestor node of a node corresponding to the second node identifier contained in the second portion.

6. The method of claim 5 wherein said second node identifier is retrieved in response to said identifier of said ancestor node corresponding to said first node identifier.

7. The method of claim 1 wherein said preselected distance value is determined in response to a second parameter.

8. The method of claim 7 wherein said first, and second parameters each comprise Lightweight Directory Access Protocol (LDAP) search parameters.

9. The method of claim 1 further comprising the step of mapping a value of a second parameter to said first node identifier, wherein said second parameter comprises a search parameter.

10. A computer program product embodied in a tangible storage medium, the program product comprising a program of instructions for performing the method steps of:

retrieving one or more second node identifiers, and an associated distance value in response to a first node identifier; and for each node corresponding to one of said one or more second identifiers having a corresponding one of said associated distance value not greater that a preselected distance value, matching said node to a second parameter, wherein the first node identifier comprises a directory node distinguished name search parameter, and the associated distance value comprises a number of levels between the directory node having the first node identifier and a directory node having the second node identifier.

11. The program product of claim 10 further comprising instructions for performing the step of returning a value of each of one or more selected members of each node having a match in response to said matching step.

12. The program product of claim 10 wherein said one or more second node identifiers and said associated distance value are retrieved from a table, said table including an entry corresponding to each said second node identifier, each entry having a first portion for containing said second node identifier and a second portion for containing said associated distance.

13. The program product of claim 12 further comprising instructions for performing the step of generating said table.

14. The program product of claim 12 wherein each entry of said table includes a third portion for containing an identifier of an ancestor node of a node corresponding to the second node identifier contained in the second portion.

15. The program product of claim 14 wherein said second node identifier is retrieved in response to said identifier of said ancestor node corresponding to said first node identifier.

16. The program product of claim 10 wherein said preselected distance value is determined in response to a second parameter.

17. The program product of claim 16 wherein said first and second parameters each comprise Lightweight Directory Access Protocol (LDAP) search parameters.

18. The program product of claim 10 further comprising instructions for performing the step of mapping a value of a second parameter to said first node identifier, wherein said second parameter comprises a search parameter.

19. A data processing system comprising:

circuitry operable for retrieving one or more second node identifiers, and an associated distance value in response to a first node identifier; and circuitry operable for, for each node corresponding to one of said one or more second identifiers having coresponding one of said associated distance value not greater that a preselected distance value, matching said node to a first parameter, wherein the first node identifier comprises a directory node distinguished name search parameter, and the associated distance value comprises a number of levels between the directory node having the first node identifier and a directory node having the second node identifier.

20. The system of claim 19 further comprising circuitry operable for returning a value of each of one or more selected members of each node having a match in response to said matching step.

21. The system of claim 20 wherein said one or more second node identifiers and said associated distance value are retrieved from a table, said table including an entry corresponding to each said second node identifier, each entry having a first portion for containing said second node identifier and a second portion for containing said associated distance.

22. The system of claim 21 further comprising circuitry operable for generating said table.

23. The system of claim 21 wherein each entry of said table includes a third portion for containing an identifier of an ancestor node of a node corresponding to the second node identifier contained in the second portion.

24. The system of claim 23 wherein said second node identifier is retrieved in response to said identifier of said ancestor node corresponding to said first node identifier.

25. The system of claim 19 wherein said preselected distance value is determined in response to a second parameter.

26. The system of claim 25 wherein said first and second parameters each comprise Lightweight Directory Access Protocol (LDAP) search parameters.

27. The system of claim 19 further comprising circuitry operable for mapping a value of a second parameter to said first node identifier, wherein said second parameter comprises a search parameter.

* * * * *